May 22, 1962 H. J. McLEAN 3,035,652
VENTILATION OF TRACTION MOTORS
Filed Aug. 12, 1960 4 Sheets-Sheet 1

INVENTOR.
HOWARD J. McLEAN
BY
*Robert H Montgomery*
ATTORNEY

INVENTOR.
HOWARD J. McLEAN
BY
Robert H Montgomery
ATTORNEY

May 22, 1962    H. J. McLEAN    3,035,652
VENTILATION OF TRACTION MOTORS
Filed Aug. 12, 1960    4 Sheets-Sheet 4

INVENTOR.
HOWARD J. McLEAN
BY Robert H. Montgomery
ATTORNEY

United States Patent Office 3,035,652
Patented May 22, 1962

3,035,652
VENTILATION OF TRACTION MOTORS
Howard J. McLean, Erie, Pa., assignor to General Electric Company, a corporation of New York
Filed Aug. 12, 1960, Ser. No. 49,232
8 Claims. (Cl. 180—10)

This invention relates to electrically powered traction wheels and more particularly relates to the construction and ventilation of the driving motor of such wheels.

In Patent 2,899,005 of William Speicher issued August 11, 1959, and assigned to the same assignee as this invention, is disclosed and claimed an electrically powered wheel wherein the magnet frame or stator of an electric motor is made cylindrical and the wheel is rotatably mounted on the motor magnet frame which serves as a non-rotating axle for the wheel. The magnet frame has at one end affixed thereto or integral therewith a mounting flange by means of which it may be secured to a vehicle body. In the illustrated embodiment of the Speicher invention, the rotor shaft of the motor extends into a gear casing immediately adjacent one end of the motor and carries a pinion gear thereon which meshes with three surrounding gears which in turn, through reduction gears, drive a ring gear about the magnet frame which drives the wheel felly and pneumatic tire thereon, which are rotatably supported on the magnet frame.

The above-mentioned arrangement provides a compact and sturdy electric traction wheel of reduced weight. However, the unusual manner in which the motor is mounted and forms the hub of the wheel does not allow use of conventional methods of introducing air to the motor for ventilation thereof.

If the gearing were placed on the outboard side of the wheel, air could be introduced to the motor from the vehicle side of the wheel hub. However, maintenance of the motor, particularly the current collector assembly and mechanical brakes, would be extremely difficult without removal of the gear case and housing. By placing the current collector assembly on the outboard side of the wheel, maintenance and accessibility of this and other motor elements is facilitated. However, a ventilation problem then arises, as well as the problems of electrically connecting the motor to the power source and supplying actuating fluid to the mechanical brakes. Positioning of the gear drive on the inboard side of the hub effectively cuts off the entire area available for introducing air into the motor. The only space now available is the triangular-shaped areas between the gears. These areas are small and the required high air velocities and static head of the constricting passages would require an out-sized blower to force sufficient air into the motor to achieve adequate ventilation.

Therefore, it is a primary object of this invention to provide a simple, economical ventilation arrangement for motors of the aforementioned powered wheels.

It is another object of this invention to provide a sturdy motor and drive structure which provides efficient ventilation of a traction motor of the aforementioned type.

Briefly stated, in carrying out my invention in one form thereof, I provide a hollow cylindrical magnet frame having a mounting flange on one end thereof, space the gear case a predetermined axial distance from the mounting flange, and rigidly secure it thereto to provide air passages between the gear case and mounting flange into the motor. I further provide a plenum chamber about the air passages and means for forcing air into the plenum chamber to establish a plenum condition which forces air through the motor in an axial direction.

Further objects and advantages of this invention will become apparent and the invention will be best understood by reference to the following description taken in connection with the accompanying drawings. The features of novelty which characterize this invention will be pointed out with particularity in the claims annexed to and forming part of this specification.

Figure 1:
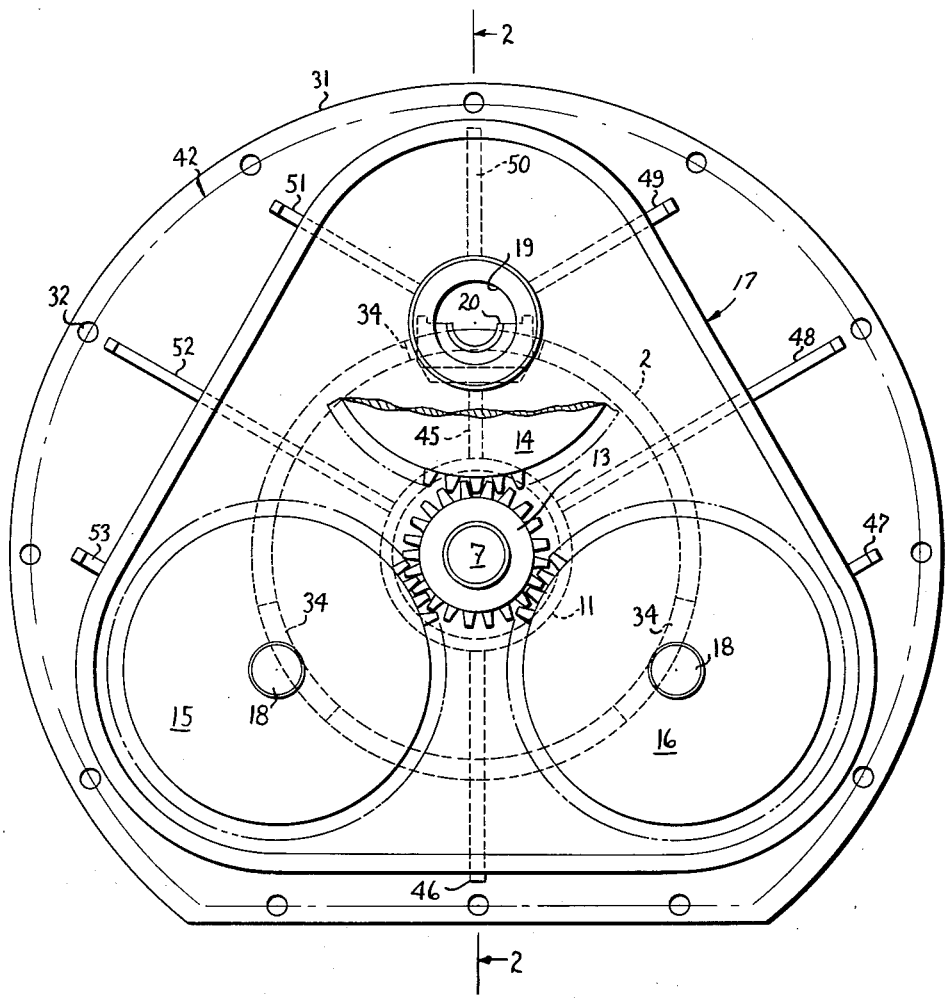
FIGURE 1 illustrates a view partially cut away of the gear case end of the motor and drive with the gear cover recovered.
Figure 2:
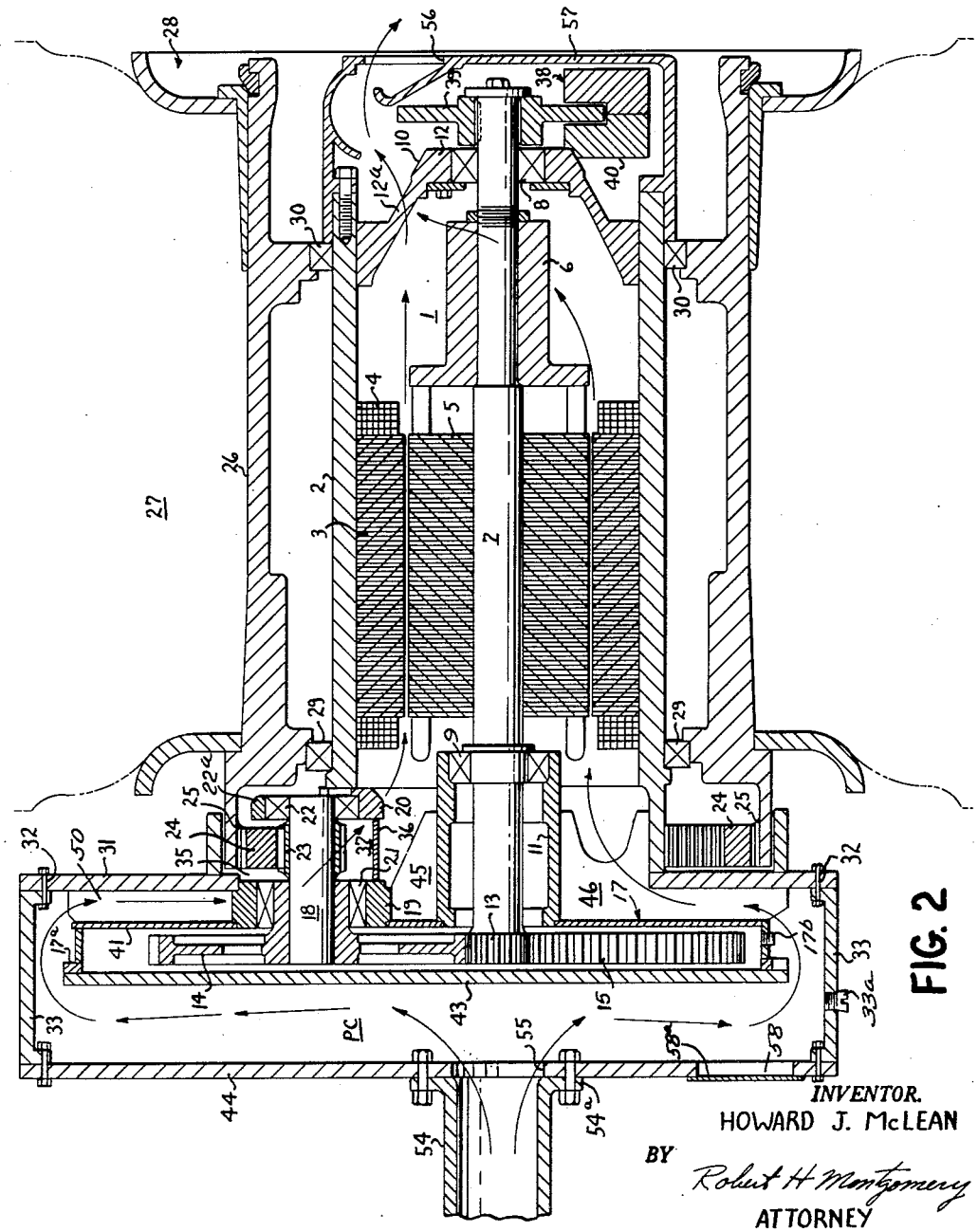
FIGURE 2 is a sectional view along line 2—2 of FIGURE 1.

Reference is now made to FIGS. 1 and 2 which illustrate a motor with a drive mechanism, embodying my invention, for driving a wheel having a pneumatic tire mounted thereon. The motor 1, FIG. 2, comprises a generally hollow cylindrical stator housing or magnet frame 2. Pole pieces 3 with field windings 4 thereon together with housing 2 to which they are secured, comprise the stator assembly. An armature 5, together with commutator 6 is mounted on shaft 7 and adapted to rotate therewith. For clarity of illustration, brushes and brush rigging are not shown. Shaft 7 is rotatably supported and spaced with respect to the stator by bearing assemblies 8 and 9 in the motor frame heads or bearing brackets 10 and 11 respectively. The bearing bracket 10 comprises a hub portion 12 with spoke-like members 12a defining openings therebetween extending radially to the magnet frame 2 and being secured thereto by suitable means. The structure and function of bearing bracket 11 is hereinafter described.

The shaft 7 has secured to what will be referred to as the inboard end thereof, a pinion or sun gear 13 which meshes with and drives gears which I refer to as planetary gears 14, 15 and 16 in gear case 17. The planetary gears are each drivingly mounted on a shaft 18, each of which is rotatably mounted in brackets or collars 19 and bearing blocks 20 by means of bearing assemblies 21 and 22 therein respectively. A bearing assembly cap 22a, shown only in FIG. 2, fits over the upper portion of the outer race of bearing 22 and cooperates with bearing block 20 to form a housing for the bearing assembly 22. Driveably mounted on each of shafts 18 and driven thereby is a reduction gear 23 which meshes with and drives ring gear 24 which is positioned about the inboard end of the cylindrical housing 2 on the reduction gears 23. The ring gear 24 meshes with gear teeth 25 on an inner periphery of the wheel rim or felly 26. Mounted on felly 26 is pneumatic tire 27 which is held thereon by a suitable tire mounting arrangement 28. The felly 26 is rotatably mounted on cylindrical housing 2 by means of anti-friction bearing assemblies 29 and 30.

While only one reduction gear-ring gear arrangement is clearing illustrated in the drawings, it will be apparent that there is a reduction gear 23 on each of the gear shafts 18 driven by a planet gear. In FIG. 1, I have shown cut away a portion of gear 14 to illustrate the bearing block 20 which is mounted on cylindrical housing 2. It will be understood that bearing blocks 20 are provided for each planetary and reduction assembly.

Rigidly secured to the inboard end of the cylindrical housing 2 by welding is an annular mounting flange 31 having a ring of bolt holes 32 therein for mounting the powered wheel assembly on a vehicle body or frame represented as channel members 33. A bottom portion of the flange 31 may be cut off to provide ground clearance between flange and earth, if desired.

It will be seen that cut-outs 34, shown only in FIG. 1, are provided at spaced intervals in the inboard end of cylindrical housing 2 to provide for reduction gear assemblies each comprising bearing brackets and supports, the gear shaft, gear shaft bearings and gear. Suitable and complementary cut-outs 35, shown only in FIG. 2, are provided also in the mounting flange 31. The housing and flange cut-outs 34 and 35 are spaced about the drive shaft axis dependent on the number of planetary and reduction gear assemblies. In this drawing the cut-outs are 120° on centers. A C-shaped member 36, FIG. 2, extends between collar 19 and bearing block 20 and the edges of cut-outs 34 to form an enclosure for the reduction gear 23 and provide a reservoir 37 for gear lubricant.

The aforementioned structure falls within the scope of the afore-mentioned Speicher invention, and reference may be had to Patent 2,899,005 of William B. Speicher for a more detailed description of a structurally similar and operationally identical powered wheel drive assembly. I contemplate utilization of structural details similar to those shown in the aforesaid patent, such as motor oil and dirt sealing means, etc., which are not illustrated herein.

It will be noted that the felly 26 and ring gear arrangement prevent access to the periphery of cylindrical housing to allow the introduction of ventilating air flow into the motor 1, and relatively little space is available between the gears 14, 15 and 16 to provide ventilating air ducts through the gear case 17 into the motor; allow the introduction of electrical connecting cables (not shown) to the electrical circuits of the motor or introduction of a brake fluid hose (not shown) to mechanical brake mechanism 38 at the outboard end of the motor 1. The mechanical brakes may be of the disc type comprising a brake disc 39 splined to the outboard end of the shaft 7 and an actuating mechanism 40, represented schematically, to frictionally engage the surfaces of the brake disc 39. It is imperative for ease of maintenance that the items requiring frequent maintenance, i.e., commutator brushes (not shown) and brake mechanism 38 be accessible for maintenance and servicing.

Therefore, I provide a structure which not only allows adequate ventilation of the motor, but which additionally provides access into the motor for electrical connectors and conduit for brake actuating fluid. Furthermore, the means in which I allow introduction and distribution of air into the motor is purposely tied into the gear lubrication system to provide cooling thereof.

In accordance with my invention, I space the back plate 41 of the gear box 17 a predetermined distance from the inboard surface of the mounting flange 31 and shape and dimension the gear box 17 to be no greater than the inboard bolting periphery 42 of the mounting flange. With reference to FIG. 1, it may be seen that I have provided a triangular gear case whose outline falls within the flange bolting periphery 42.

A gear case cover plate 43 mates with and is bolted to a flange 17a on gear case 17 to close the gear box 17 and retain gear lubricants therein. When the mounting flange 31 is bolted to a vehicle body or frame as represented by the channel members 33 in FIG. 2, a cavity is defined by the channel members 33, flange 31 and cover plate 44 which is in effect a plenum chamber PC.

In the embodiment of the invention illustrated the gear case 17 is rigidly supported on mounting flange 31 by means of the collars 19 welded therebetween which also serve as brackets for bearing assemblies 21. The bracket or frame head 11 is welded to back plate 41 and gussets 45 are welded each to a collar 19, and bracket 11 to rigidly support and centrally space bracket 11 with respect to the housing 2. Gussets 46 through 52 may be welded between flange 31 and back plate 41. It is preferable that gussets 46, 48 and 52 extend into the cylindrical housing 2 and be welded between the bracket 11 and housing 2 to lend additional rigidity to the heavily loaded flange 31 to help it withstand bending moments.

An air duct 54 communicating with an air blower (not shown) may be connected about an opening 55 in cover plate 44 to conduct air from the blower to the plenum chamber PC. The duct may be formed with a flange 54a thereon driving bolt holes therethrough to allow the duct to be removably secured to the cover plate 44. It is preferred that the air be introduced along the axis of the motor centrally of the gear case to provide equal distribution of air flow about the gear case, into the air passages defined by the flange 31 and back plate 41 into the interior of the motor.

When air is forced through duct 54 communicating with plenum chamber PC into plenum chamber PC to create a plenum condition therein, the plenum condition distributes air over gear case cover 43 and forces air flow between the flange 31 and back plate 41 into the inboard end of the motor 1 and through the motor 1 in an axial direction as shown by the arrows, FIG. 2. At the outboard end of the motor 1, the ventilating air flow is exhausted in to the atmosphere through opening 56 in the motor end closure 57. This structure provides flow of air over and around the gear case surfaces to convection cool the metal gear case surfaces and thus reduce the oil volume which would otherwise be required to act as a heat sink to dissipate heat generated by operation of the gears.

An access aperture 58, normally closed by removable cover plate 58a, is provided to the plenum chamber PC to allow removal of oil drain plug 17b in the bottom of gear case 17. A second drain port and plug 33a is provided in the bottom of plenum chamber PC. Additionally, a lubricating oil inlet, together with a dipstick (not shown), may be provided near or at the top of the gear case. Although not shown, it is desirable to provide a sealing gasket between flange 17a and gear case cover 43 to guard against oil leakage from the gear case.

Although it is not illustrated, electrical cables for conducting electrical energy to the motor circuits are brought into the motor through the air passages defined by the flange 31 and back plate 41, as is a brake fluid conduit which is connected to the brake actuating mechanism.

Figure 3:
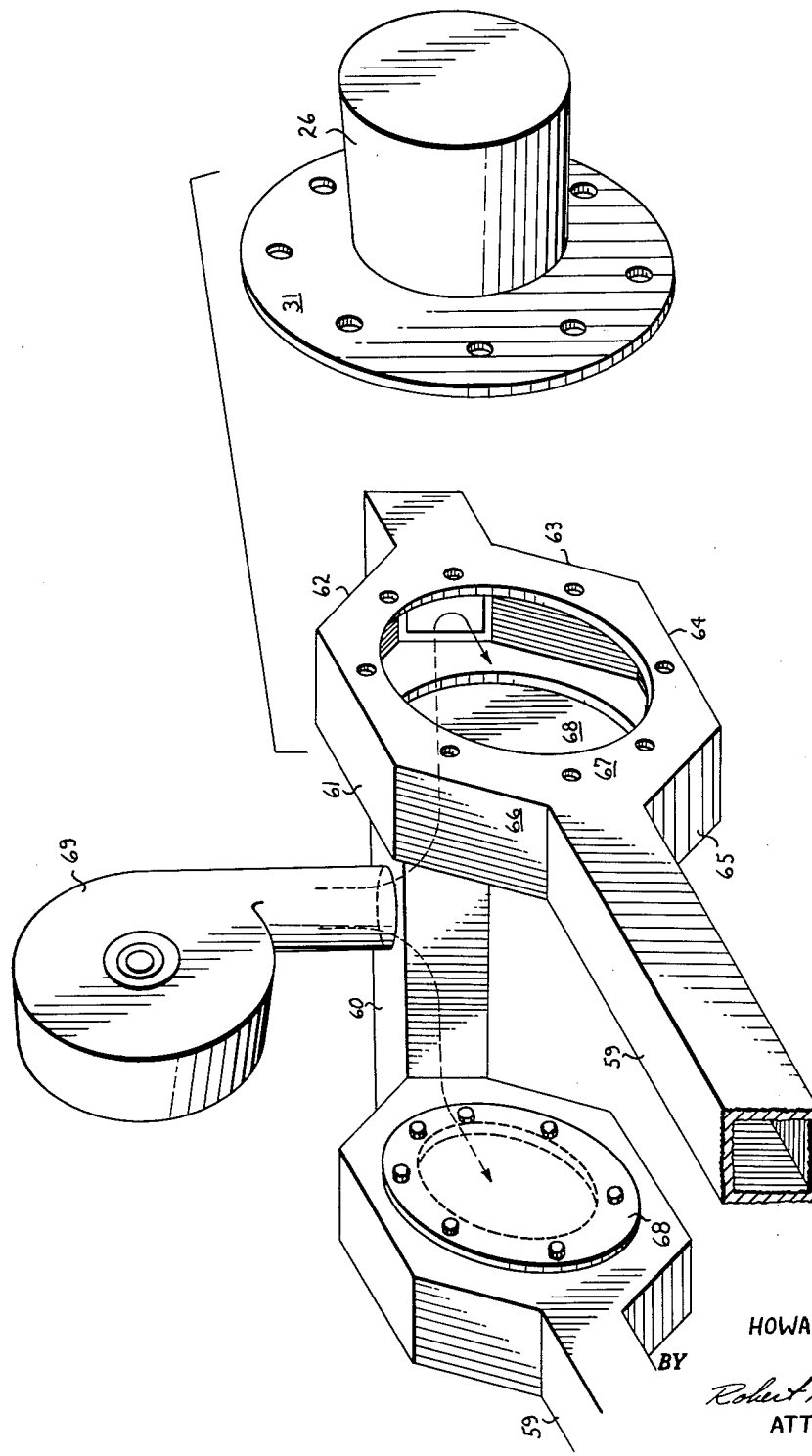
FIGURE 3 illustrates a portion of a vehicle frame upon which a powered wheel embodying my invention may be mounted and the use of the vehicle frame in defining a plenum chamber.

Reference is now made to FIG. 3, wherein I show a portion of a vehicle body upon which a powered wheel embodying my invention may be mounted to provide tractive power therefor. The powered wheel is represented by the mounting flange 31 and felly 26 without a tire thereon. FIG. 3 depicts the rear frame of a vehicle comprised of structural sections which may be hollow box sections such as side sills 59 and end sill 60. Channel sections 61 through 66 form a wheel mounting surface 67 and together with plate 68 form a cavity proportioned to receive gear case 17 and in cooperation with flange 31 bolted to surface 67 to define a plenum chamber. The powered wheel is secured to the frame by bolting flange 31 to surface 67 at the bolt holes. A blower 69 is illustrated as mounted on hollow end sill 60 and adapted to draw air therein and to force the air into the hollow structural member forming end sill 60, and through the structural member into the plenum chambers.

Practically speaking, a blower would not be located near the end of the vehicle inasmuch as in this location considerable dust is likely to be created at the rear of the vehicle which would be blown into the motor. In practice, it is preferred to have the blower mounted in an elevated position at a forward location in the vehicle and provide ducts to guide air blown therein to the plenum chamber. Some vehicles may be so constructed that the frame members are not suitable for aiding in defining a plenum chamber about the gear case. In such a situation, it is one aspect of my invention to fabricate a plenum chamber.

Figure 5:
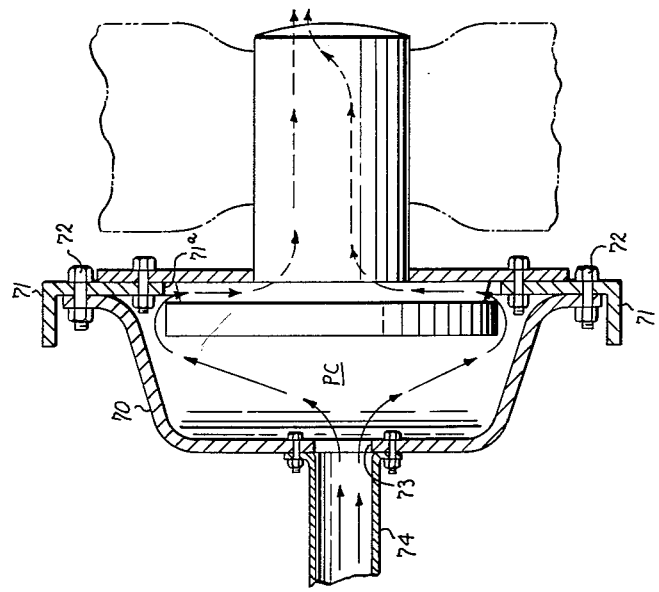
FIGURES 4 and 5 show a powered wheel mounting arrangement wherein an additional member is utilized to define a plenum chamber.
Figure 4:
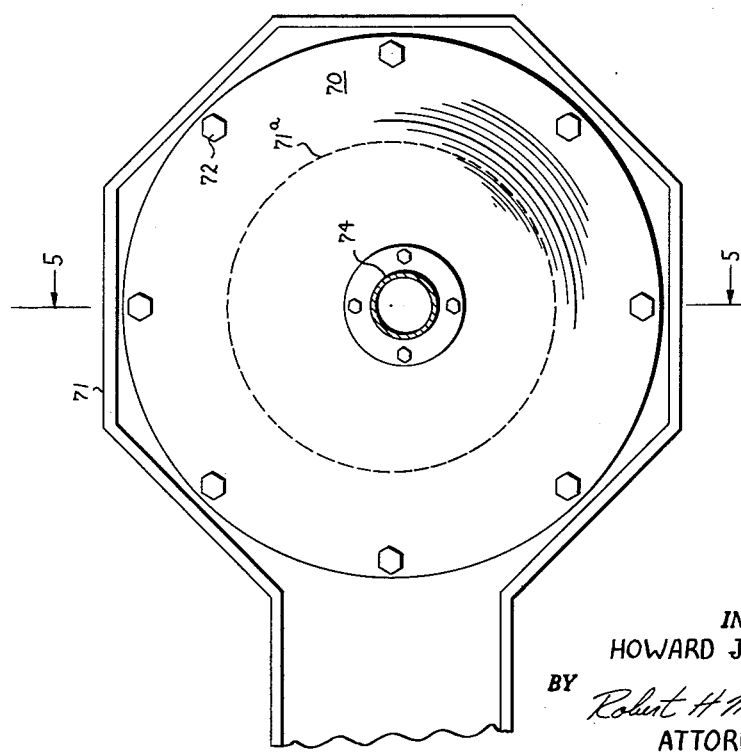

In FIGS. 4 and 5 I show an arrangement where a dished member 70 is employed to define with the mounting flange a plenum chamber PC. FIG. 5 is a sectional view along line 5—5 of FIG. 4. The dished member may be secured to the vehicle frame 71 about the mounting aperture 71a defined therein by bolts 72 and have an air duct aperture 73 therein to allow air to be forced therein through duct 74 from a blower (not shown). Obviously, other air ducting arrangements and plenum chamber defining structures and members may be constructed to suit a particular application of the illustrated powered wheel using either the frame members as ducts or providing separate ducts, or using both in part.

The volume of the plenum chamber, capacity of the blower, and air duct sizes should be so chosen as to create a predetermined pressure in the plenum chamber and therefore a pressure differential between the ends of the motor sufficient to force a volume of air per unit time through the motor required for adequate ventilation of the motor and cooling of the gear case. Other factors which must be considered are the duct pressure drop and motor ratings including rated temperature rise.

It may be desirable to locate air directing baffles in the plenum chambers to prevent turbulence in the corners thereof, and also to place gaskets between the bolted joints of members defining a plenum chamber.

In FIGS. 1 and 2, I illustrated a fabricated motor construction. However, a cast motor assembly may embody my invention. When cast, cylindrical magnet frame 2, flange 31, collars 19, bearing blocks 20, and members 36 are cast in one unitary structure. Additionally, the bearing bracket 11 with gussets 45 may be made as a casting and welded to the main casting. When cast, the collars 19 appear on the inboard end of the structure as bosses and the gear case back plate 41 is fillet welded to these bosses.

While I have illustrated and described preferred embodiments of this invention and described modifications thereof, further changes in the disclosed embodiments may occur to those skilled in the art without departing from the spirit and scope of this invention. Accordingly, it is my intention to cover all changes and modifications of the examples of the invention herein chosen for purposes of disclosure, which do not constitute departures from the spirit and scope of the invention.

What I claim as new and desire to secure by Letters Patent of the United States is:

1. A powered wheel assembly comprising a motor having a hollow cylindrical housing and a shaft adapted to have a torque produced thereon through motor action, a wheel rim rotatably mounted on said housing, said housing having a radially outwardly extending flange on one end thereof, the motor shaft having a pinion gear on the end thereof extending axially beyond said flange, a first plurality of gears arranged to be driven by said pinion, each of said first gears being mounted on a gear shaft and driving a reduction gear, a ring gear about said housing driveably engaged by said reduction gears and drivingly engaging said wheel rim, said pinion gear and said first gears being enclosed in a gear case, means rigidly supporting said gear case on and spacing it from said housing whereby said gear case and flange define passages therebetween to openings in said housing whereby air forced through the passages enters said housing and flows axially therethrough, said support and spacing means comprising bearing brackets rotatably supporting said gear shafts.

2. A powered wheel assembly comprising a motor having a hollow cylindrical housing and a shaft adapted to have a torque produced thereon through motor action, a wheel rim rotatably mounted on said housing, said housing having a radially outwardly extending flange on one end thereof, the motor shaft having a pinion gear on the end thereof extending axially beyond said flange, a first plurality of gears arranged to be driven by said pinion, each of said first gears being mounted on a gear shaft and driving a reduction gear, a ring gear about said housing driveably engaged by said reduction gears and drivingly engaging said wheel rim, said pinion gear and said first gears being enclosed in a gear case, means rigidly supporting said gear case on and spacing it from said housing whereby said gear case and flange define passages therebetween to openings in said housing whereby air may flow through the passages, enter said housing and flow axially therethrough, and means cooperating with said flange to form an enclosure about said gear case in which a plenum condition may be created to cause air to flow through said passages.

3. A powered wheel assembly comprising a motor having a hollow cylindrical housing and a shaft adapted to have a torque produced thereon through motor action, a wheel rim rotatably mounted on said housing, said housing having a radially outwardly extending flange on one end thereof, the motor shaft having a pinion gear on the end thereof extending axially beyond said flange, a first plurality of gears arranged to be driven by said pinion, each of said first gears being mounted on a gear shaft and driving a reduction gear, a ring gear about said housing driveably engaged by said reduction gears and drivingly engaging said wheel rim, said pinion gear and said first gears being enclosed in a gear case, means rigidly supporting said gear case on and spacing it from said housing whereby said gear case and flange define passages therebetween to openings in said housing whereby air may flow through the passages, enter said housing and flow axially therethrough, and means for creating a pressure differential between the flange end of said housing and the other end of said housing whereby air is caused to flow radially through said passages and axially through said motor to effect ventilation thereof.

4. A powered wheel assembly comprising a motor having a hollow cylindrical housing and a shaft adapted to have a torque produced thereon through motor action, a wheel rim rotatably mounted on said housing, said housing having a radially outwardly extending flange on one end thereof, the motor shaft having a pinion gear on the end thereof extending axially beyond said flange, a plurality of gears arranged to be driven by said pinion, and arranged to rotate said rim on said housing, said pinion gear and said gears being enclosed in a gear case, means rigidly supporting said gear case on and spacing it from said housing whereby said gear case and flange define passages therebetween to openings in said housing whereby air may flow through the passages, enter said housing and flow axially therethrough, and means for increasing the air pressure at the flange end of said housing whereby air is caused to flow through said passages into said motor and axially therethrough.

5. In combination, a vehicle, a powered wheel assembly comprising a motor having a hollow cylindrical housing and a shaft adapted to have a torque produced thereon through motor action, a wheel rim rotatably mounted on said housing, said housing having a radially outwardly extending mounting flange on one end thereof, the motor shaft having a pinion gear on the end thereof extending axially beyond said flange, a wheel mounting surface on said vehicle for mounting said flange thereon, said surface defining an opening therein, a plurality of gears arranged to be driven by said pinion, said gears arranged to cause rotation of said rim on said housing, said pinion gear and said gears being enclosed in a gear case, means rigidly supporting said gear case on and spacing it from said housing whereby said gear case and flange define passages therebetween to openings in said housing whereby air may flow through the passages, enter said housing and flow axially therethrough, said flange being mounted on said surface and said gear case being received in said opening, means cooperating with said flange to form an enclosure about said gear case in which a plenum condition may be created to cause air to flow through said passages into said housing and flow axially therethrough.

6. The combination of claim 5 wherein said vehicle forms part of said enclosure and means for introducing air into the enclosure to create a plenum condition therein.

7. A motor drive assembly comprising a motor having a hollow cylindrical housing and a shaft adapted to have a torque produced thereon through motor action, a mounting flange extending radially outward from one end thereof, a wheel rim surrounding said housing and being rotatably mounted thereon by anti-friction bearing assemblies, the motor shaft extending axially outward from said flanged end and having a pinion gear thereon, a first plurality of gears driveably engaged with said pinion gear, a gear case enclosing said pinion and first gears, each of said first gears being mounted on a first end of a gear shaft extending toward the motor, a first plurality of bearing brackets spacing said gear case from said flange and rigidly secured therebetween to define passages therebetween communicating with the interior of the motor whereby ventilating air may flow through said passages to enter the end of said cylindrical housing, bearing means in each of said bearing brackets rotatably supporting a gear shaft therein, bearing supports having bearing assemblies therein rotatably supporting each of said gear shafts at the second end of said shafts, each bearing bracket and each bearing support means having a reduction gear therebetween on the associated gear shaft, said bearing support means being rigidly secured to or integral with said housing, each of said gear shafts, reduction gear and bearing support assemblies being in recesses in and defined by said flange and housing, a ring gear driveably mounted on said reduction gears and driveably engaging said rim.

8. The arrangement of claim 7 wherein the housing, flange, bearing supports and bearing brackets are cast integral.

References Cited in the file of this patent
UNITED STATES PATENTS

| | | |
|---|---|---|
| 2,540,099 | Christian | Feb. 6, 1951 |
| 2,869,659 | Mayo | Jan. 20, 1959 |
| 2,899,005 | Speicher | Aug. 11, 1959 |